(12) United States Patent
Suemitsu et al.

(10) Patent No.: US 9,599,007 B2
(45) Date of Patent: Mar. 21, 2017

(54) MOBILE RECYCLER

(71) Applicant: KOMATSU LTD., Tokyo (JP)

(72) Inventors: Yasukuni Suemitsu, Hirakata (JP);
Yasutaka Nishida, Hirakata (JP);
Takahito Hashino, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/650,688

(22) PCT Filed: Aug. 25, 2014

(86) PCT No.: PCT/JP2014/072143
§ 371 (c)(1),
(2) Date: Jun. 9, 2015

(87) PCT Pub. No.: WO2016/030940
PCT Pub. Date: Mar. 3, 2016

(65) Prior Publication Data
US 2016/0281575 A1    Sep. 29, 2016

(51) Int. Cl.
| | |
|---|---|
| *B02C 13/02* | (2006.01) |
| *F01N 13/00* | (2010.01) |
| *B02C 21/02* | (2006.01) |
| *B60K 13/04* | (2006.01) |
| *F01N 3/28* | (2006.01) |

(Continued)

(52) U.S. Cl.
CPC ............ *F01N 13/002* (2013.01); *B02C 21/02* (2013.01); *B02C 21/026* (2013.01); *B60K 13/04* (2013.01); *B62D 55/10* (2013.01); *F01N 3/2066* (2013.01); *F01N 3/28* (2013.01); *F01N 3/2896* (2013.01); *F01N 2570/14* (2013.01); *F01N 2590/08* (2013.01)

(58) Field of Classification Search
CPC .............................. B02C 21/02; B02C 21/023
USPC ....................................... 241/101.74–101.76
See application file for complete search history.

(56) References Cited

U.S. PATENT DOCUMENTS

| | | |
|---|---|---|
| 5,104,154 A | 4/1992 | Shibano |
| 6,877,610 B2 * | 4/2005 | Boast ...................... B02C 21/02 209/257 |

(Continued)

FOREIGN PATENT DOCUMENTS

| | | |
|---|---|---|
| JP | H02-283852 A | 11/1990 |
| JP | H08-192647 A | 7/1996 |

(Continued)

OTHER PUBLICATIONS

U.S. Appl. No. 14/650,635, filed Jun. 9, 2015, Suemitsu.

*Primary Examiner* — Faye Francis
(74) *Attorney, Agent, or Firm* — Drinker Biddle & Reath LLP (57) ABSTRACT

Such a mobile recycler that an operator can replenish a reducing agent tank with a reducing agent from the ground is provided. A reducing agent tank stores a reducing agent supplied to an exhaust gas treatment device treating an exhaust gas from an engine through reduction reaction. The reducing agent tank is arranged in front of a front end of a crawler belt and in the rear of a front end of a track frame in a fore/aft direction. The reducing agent tank is arranged as being superimposed on the crawler belt in a front view, below an engine frame at a distance therefrom.

6 Claims, 6 Drawing Sheets

(51) Int. Cl.
 *B62D 55/10* (2006.01)
 *F01N 3/20* (2006.01)

(56) References Cited

U.S. PATENT DOCUMENTS

| | | | | |
|---|---|---|---|---|
| 8,020,800 B2 * | 9/2011 | Potts | ................... | B02C 21/026 |
| | | | | 241/101.74 |
| 8,042,753 B2 * | 10/2011 | Yamaguchi | ............... | B02C 1/04 |
| | | | | 241/101.74 |
| 8,434,706 B2 * | 5/2013 | Davis | ................... | B02C 21/026 |
| | | | | 198/313 |
| 8,469,298 B2 * | 6/2013 | Robinson | ............. | B02C 21/026 |
| | | | | 241/101.74 |
| 2010/0258364 A1 | 10/2010 | Bolz et al. | | |

FOREIGN PATENT DOCUMENTS

| | | | |
|---|---|---|---|
| JP | 2000-324909 | A | 11/2000 |
| JP | 2004-174447 | A | 6/2004 |
| JP | 2005-112146 | A | 4/2005 |
| JP | 2008-215003 | A | 9/2008 |
| JP | 2010-248895 | A | 11/2010 |
| JP | 2011-064134 | A | 3/2011 |
| JP | 2012-091084 | A | 5/2012 |

* cited by examiner

MOBILE RECYCLER

TECHNICAL FIELD

The present invention relates to a mobile recycler.

BACKGROUND ART

In consideration of environmental issues, a mobile recycler has recently been made use of, which is self-propelled to a site where disposal objects are generated and subjects the disposal objects to disposal at any location at the site for use as a recycled source material.

An engine and an exhaust gas treatment device for treating an exhaust gas from the engine are mounted on a mobile recycler. As the exhaust gas treatment device, for example, a selective catalytic reduction device (SCR) purifying an exhaust gas by reducing a nitrogen oxide in the exhaust gas is available. A reducing agent used for this exhaust treatment is stored in a reducing agent tank.

Japanese Patent Laying-Open No. 2012-91084 (PTD 1) discloses a mobile recycler in which a reducing agent tank is provided upstream of an engine in a flow of cooling wind generated by a cooling fan and the cooling wind which flows toward the engine passes through a space for mounting the reducing agent tank.

CITATION LIST

Patent Document

PTD 1: Japanese Patent Laying-Open No. 2012-91084

SUMMARY OF INVENTION

Technical Problem

A reducing agent is carried manually to a mobile recycler as it is accommodated in a small-capacity container. From a point of view of operability, a reducing agent tank can be replenished with the reducing agent while an operator stands on the ground.

In PTD 1, a tank mount portion on which a reducing agent tank is mounted is provided directly under an engine frame on which an engine is mounted. Since a discharge conveyor transporting a disposal object should be arranged below an engine frame in a mobile recycler, the engine frame is arranged at a high position. Therefore, it is difficult for an operator to replenish the reducing agent tank disclosed in PTD 1 with the reducing agent from the ground.

An object of the present invention is to provide such a mobile recycler that an operator can replenish a reducing agent tank with a reducing agent from the ground.

Solution to Problem

A mobile recycler according to the present invention includes an engine, an engine frame, a track frame, a pair of traveling apparatuses, a work implement, a discharge conveyor, an exhaust gas treatment device, and a reducing agent tank. The engine generates driving force. The engine is mounted on the engine frame. The track frame is attached below the engine frame. The traveling apparatus is supported on the track frame. The traveling apparatus has a crawler belt. The work implement is mounted on the engine frame. The discharge conveyor transports a disposed object discharged from the work implement. The discharge conveyor extends forward between the pair of traveling apparatuses. The exhaust gas treatment device treats an exhaust gas from the engine through reduction reaction. The reducing agent tank stores a reducing agent supplied to the exhaust gas treatment device. The reducing agent tank is arranged in front of a front end of the crawler belt and in the rear of a front end of the track frame in a fore/aft direction. The reducing agent tank is arranged below the engine frame at a distance therefrom. The reducing agent tank is arranged as being superimposed on the crawler belt in a front view.

A reducing agent and a precursor of the reducing agent are herein collectively referred to as a "reducing agent".

According to the mobile recycler in the present invention, arrangement of the reducing agent tank is defined at a position closer to the ground, so that the reducing agent tank is arranged at a position closer to an operator who stands on the ground. Therefore, the operator can readily replenish the reducing agent tank with the reducing agent while he/she stands on the ground.

In the mobile recycler, the reducing agent tank is superimposed on the crawler belt in the front view, at a position adjacent to the front end of the crawler belt. Thus, contact between the reducing agent tank and the ground can be suppressed while the mobile recycler runs on a slope.

In the mobile recycler, the crawler belt has a ground engaging surface coming in contact with a ground. In a side view, the reducing agent tank is arranged above a straight line which passes through a portion of the discharge conveyor protruding most on a side of the ground with respect to a direction of movement of the disposed object and a front end of the ground engaging surface. Thus, when the mobile recycler runs on a land which has not been graded or on a steep slope as well, contact of the reducing agent tank with the ground and the like can be suppressed. Therefore, damage to the reducing agent tank can be suppressed.

The mobile recycler further includes a control panel for operating the mobile recycler. The reducing agent tank is arranged adjacent to the control panel. Thus, since the operator who has checked the control panel can promptly replenish the reducing agent tank with the reducing agent, operability can be improved.

The mobile recycler further includes a pump for transferring the reducing agent. The pump is arranged between the engine frame and the reducing agent tank. Thus, the reducing agent tank can reliably be arranged at a position below the engine frame at a distance therefrom.

In the mobile recycler, the reducing agent tank is supported by the track frame. Thus, the reducing agent tank can reliably be supported and fixed at a position below the engine frame at a distance therefrom.

Advantageous Effects of Invention

As described above, according to the present invention, since arrangement of the reducing agent tank in a vertical direction is defined, replenishment of the reducing agent tank with the reducing agent while an operator stands on the ground is facilitated.

DESCRIPTION OF EMBODIMENTS

An embodiment of the present invention will be described hereinafter with reference to the drawings.

Initially, a structure of a mobile recycler in one embodiment of the present invention will be described. A mobile crusher representing one example of the mobile recycler to which the concept according to the present invention is applicable will be described hereinafter, however, the present invention is applicable to any mobile recycler such as a mobile wood grinder and a mobile soil recycler.

Figure 1:
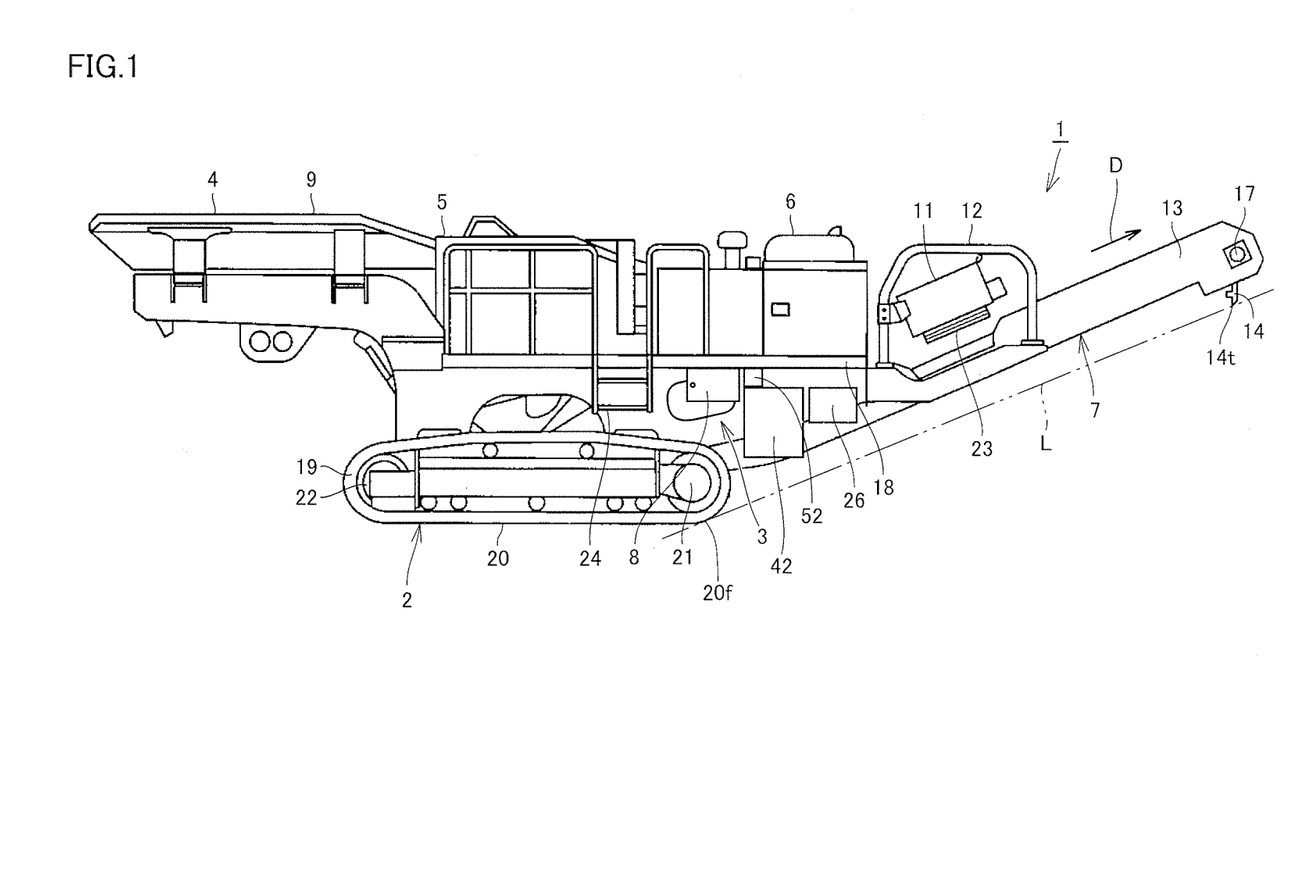
FIG. 1 is a side view of a mobile crusher according to one embodiment of the present invention.
Figure 2:
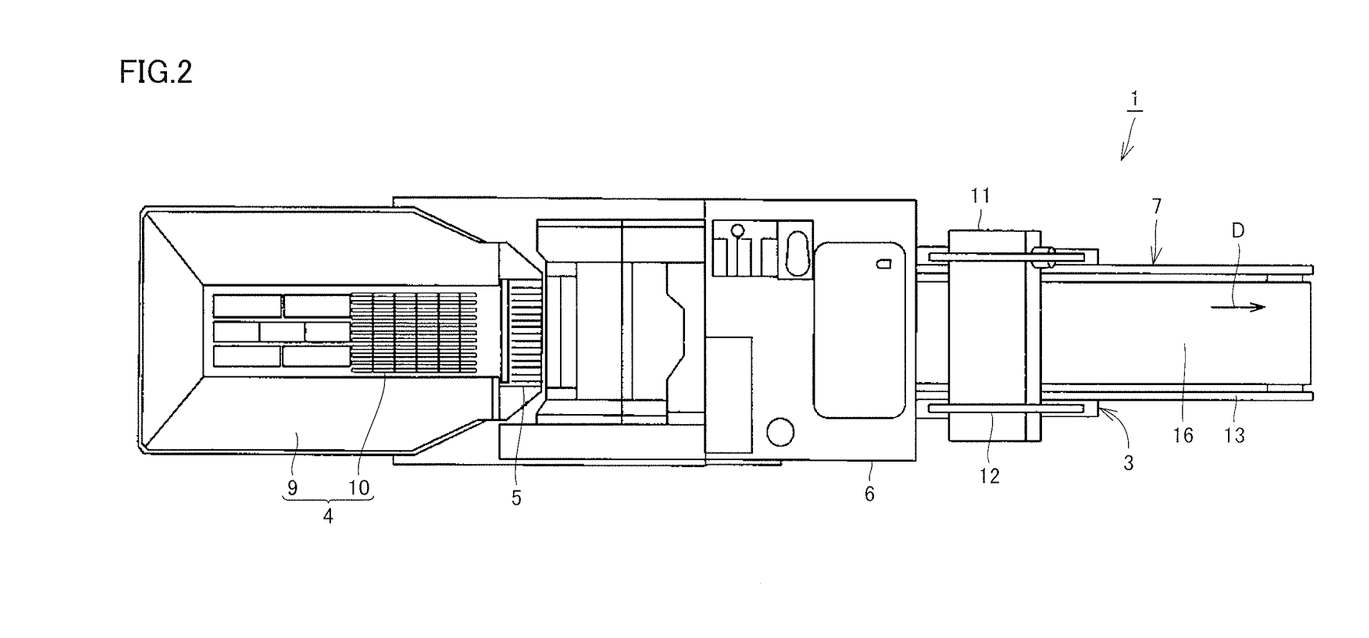
FIG. 2 is a plan view of the mobile crusher according to one embodiment of the present invention.

FIG. 1 is a side view of a mobile crusher 1 according to one embodiment of the present invention. FIG. 2 is a plan view of mobile crusher 1 according to one embodiment of the present invention. Mobile crusher 1 shown in FIGS. 1 and 2 is an apparatus suitably used for generating highly recyclable and transportable, small crushed objects, by coarsely crushing crush objects such as construction debris like concrete debris, industrial wastes, or natural stones at a construction site into a prescribed particle size.

As shown in FIGS. 1 and 2, mobile crusher 1 mainly includes a carrier 2, a crush object feeding apparatus 4, a crushing apparatus 5, an engine compartment 6, and a discharge conveyor 7. In the following, a right side in FIGS. 1 and 2 is defined as the front of mobile crusher 1 and a left side is defined as the rear of mobile crusher 1. Crush object feeding apparatus 4 is arranged on a rear side of mobile crusher 1. Discharge conveyor 7 is arranged on a front side of mobile crusher 1.

Carrier 2 has a drive wheel 21, a driven wheel 22, and a crawler belt 19. Carrier 2 is constructed such that crawler belt 19 is wound around front drive wheel 21 and rear driven wheel 22. As crawler belt 19 is wound around drive wheel 21 and driven wheel 22, a crawler belt type travel apparatus is constructed. With rotational drive of drive wheel 21, crawler belt 19 rotates so that mobile crusher 1 can self-propel itself. As shown in FIG. 1, crawler belt 19 has a ground engaging surface 20 coming in contact with the ground.

Carrier 2 is supported by a track frame 3. Carrier 2 is provided below track frame 3. Track frame 3 extends in a fore/aft direction of mobile crusher 1. On the left and right of mobile crusher 1, a pair of track frames 3 is provided. Carrier 2 is constructed such that crawler belt 19 is wound around each of the pair of left and right track frames 3. Mobile crusher 1 includes a pair of left and right carriers 2. Track frame 3 is attached below engine frame 18.

Engine compartment 6 is provided on engine frame 18. Engine compartment 6 is placed on a front side of engine frame 18. Engine compartment 6 is formed to separate an internal space therein and the outside from each other with an exterior cover being interposed. The internal space in engine compartment 6 accommodates a hydraulic pump, the engine, and an exhaust gas treatment device. The hydraulic pump transfers a hydraulic oil supplied to each hydraulic actuator for operating mobile crusher 1. The engine generates driving force for driving the hydraulic pump. The engine serves as a motive power source of mobile crusher 1. The exhaust gas treatment device treats an exhaust gas from the engine.

The engine is mounted on engine frame 18. A fuel tank, a hydraulic oil tank, and a main valve are mounted on engine frame 18. The fuel tank stores a fuel to be supplied to the engine. The hydraulic oil tank stores a hydraulic oil to be supplied to a hydraulic actuator. The main valve allows feed and discharge of the hydraulic oil suctioned from the hydraulic oil tank and transferred by the hydraulic pump to the hydraulic actuator.

Crush object feeding apparatus 4 and crushing apparatus 5 are mounted on engine frame 18. Crush object feeding apparatus 4 is placed on a rear side of engine frame 18. Crushing apparatus 5 is placed in a central portion of engine frame 18 and placed between crush object feeding apparatus 4 and engine compartment 6 in the fore/aft direction.

Crush object feeding apparatus 4 is constituted of a hopper 9 into which crush objects are dropped and a feeder 10 transporting the crush objects in hopper 9 toward crushing apparatus 5. Hopper 9 is provided to accept crush objects and has a shape increasing in width upward. Feeder 10 is provided below hopper 9 and transports crush objects which have been accepted by hopper 9 toward crushing apparatus 5.

Crushing apparatus 5 is an apparatus for crushing crush objects which have been dropped into hopper 9, and implements a work implement of mobile crusher 1. Crushing apparatus 5 is located in front of and below hopper 9 and mounted around the center in a longitudinal direction of engine frame 18. Crushing apparatus 5 is exemplified by a jaw crusher in which a crushing chamber is formed by a fixed jaw and a moving jaw moving relative to the fixed jaw and crush objects which have been introduced into the crushing chamber are crushed between the fixed jaw and the moving jaw and discharged from a discharge opening below.

Discharge conveyor 7 is an apparatus transporting disposed objects resulting from crushing by crushing apparatus 5 and discharged from crushing apparatus 5 toward the front of mobile crusher 1. Discharge conveyor 7 is assembled below engine frame 18. Discharge conveyor 7 is provided between the pair of carriers 2, below engine frame 18. Discharge conveyor 7 is formed to extend from a lower position in crushing apparatus 5 under engine compartment 6, to extend further forward, and to rise in an oblique direction to a height as high as an upper end portion of hopper 9 and engine compartment 6.

Discharge conveyor 7 has a pair of conveyor frames 13 extending in the fore/afl direction, a conveyor belt 16 provided between conveyor frames 13, and a conveyor belt drive portion 17 driving conveyor belt 16. A drive pulley and a driven pulley are provided at a front end portion and a rear end portion of conveyor frame 13 and conveyor belt 16 is wound around these drive pulley and driven pulley.

Conveyor belt 16 carries out circulating motion as it is driven by conveyor belt drive portion 17. Discharge conveyor 7 is constructed to be able to transport disposed objects dropped from crushing apparatus 5 onto conveyor belt 16 toward the front of mobile crusher 1 as conveyor belt 16 carries out circulating motion. An arrow in FIGS. 1 and 2 shows a direction in which conveyor belt 16 runs, which is a direction of movement D of disposed objects transported by conveyor belt 16.

Discharge conveyor 17 has a scraper 14. Scraper 14 is fixed to conveyor frame 13 and comes in contact with a surface of conveyor belt 16. As conveyor belt 16 carries out circulating motion while it is in contact with scraper 14, adherents such as soil which have adhered to the surface of conveyor belt 16 are scraped off by scraper 14. Deposition of adherents to the surface of conveyor belt 16 is thus suppressed.

Scraper 14 protrudes downward from conveyor frame 13. A tip end portion 14t of scraper 14 forms a portion of discharge conveyor 7, which protrudes most on a side of the ground, with respect to direction of movement D of disposed objects. Crawler belt 19 has ground engaging surface 20 and ground engaging surface 20 has a foremost front end 20f. A chain double dotted line L in FIG. 1 shows a straight line passing through tip end portion 14t of scraper 14 and front end 20f of ground engaging surface 20 in a side view.

In front of engine compartment 6, a magnetic separator 11 is arranged above discharge conveyor 7. A magnetic separator support frame 12 is fixed at a front end of track frame 3, and magnetic separator 11 is supported as being suspended from magnetic separator support frame 12. Magnetic separator 11 has a magnetic separator belt 23. As magnetic force is applied through magnetic separator belt 23, rod-shaped magnetic elements such as re-bar, nails, and wires are screened so that the magnetic elements are removed from disposed objects which move over conveyor belt 16.

A maintenance ladder 24 for an operator to access engine frame 18 is provided above carrier 2 in a side surface portion around the center in the fore/aft direction of mobile crusher 1. Maintenance ladder 24 is fixed to engine frame 18. Maintenance ladder 24 is arranged in front of crushing apparatus 5 and in the rear of engine compartment 6. An operator can reach a space formed between crushing apparatus 5 and engine compartment 6 over engine frame 18 via maintenance ladder 24. The operator can perform a maintenance operation of such apparatuses as crushing apparatus 5 and the engine and the like accommodated in engine compartment 6 in that space.

Figure 3:
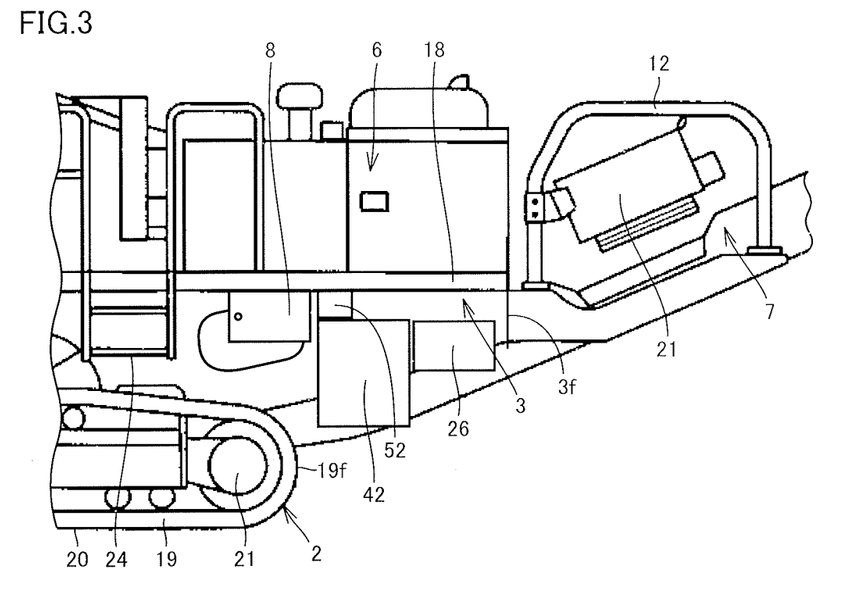
FIG. 3 is an enlarged view around a reducing agent tank included in the mobile crusher shown in FIG. 1.

FIG. 3 is an enlarged view around the reducing agent tank included in mobile crusher 1 shown in FIG. 1. As shown in FIGS. 1 and 3, a control panel 8 for operating mobile crusher 1 is provided above a front end 19f of crawler belt 19 and below engine frame 18. Control panel 8 has measuring instruments for monitoring mobile crusher 1 and various operation devices for operating feeder 10, crushing apparatus 5, and discharge conveyor 7 and the like.

A tank cover 42 is provided at a position adjacent to a front side of control panel 8. Tank cover 42 is formed of a metal material such as a steel material. An internal space in tank cover 42 accommodates the reducing agent tank storing the reducing agent. Tank cover 42 has a tank accommodation space formed therein, for accommodating the reducing agent tank. Tank cover 42 separates the tank accommodation space and the outside thereof from each other. The internal space in engine compartment 6 accommodating the engine and the tank accommodation space in tank cover 42 are formed as spaces separate from each other and formed not to communicate with each other.

Tank cover 42 and the reducing agent tank accommodated in tank cover 42 are arranged in front of front end 19f of crawler belt 19 in the fore/aft direction (in the lateral direction in FIGS. 1 and 3) of mobile crusher 1. The reducing agent tank is arranged at a position adjacent to front end 19f of crawler belt 19. Tank cover 42 and the reducing agent tank are arranged in the rear of front end 3f (FIG. 3) of track frame 3 in the fore/aft direction. Tank cover 42 and the reducing agent tank are arranged below engine frame 18 in the vertical direction.

A pump cover 52 is provided under engine frame 18 and above tank cover 42. Pump cover 52 is arranged at a position adjacent to the front side of control panel 8. An internal space in pump cover 52 accommodates a reducing agent pump transferring the reducing agent. Since the entire pump cover 52 is arranged between engine frame 18 and tank cover 42, the reducing agent pump accommodated in pump cover 52 is arranged between engine frame 18 and the reducing agent tank in the vertical direction. As tank cover 42 and the reducing agent tank are arranged with the reducing agent pump being interposed between them and engine frame 18, they are arranged below engine frame 18 at a distance therefrom.

A tool box 26 is provided at a position adjacent to a front side of tank cover 42. Tool box 26 accommodates various tools for maintenance and repair of mobile crusher 1. Tool box 26 is arranged in front of tank cover 42 and in the rear of front end 3f of track frame 3 in the fore/aft direction. Tool box 26 is arranged between front end 3f of track frame 3 and tank cover 42.

In the side views shown in FIGS. 1 and 3, tank cover 42 and the reducing agent tank are arranged on the right of control panel 8 and on the left of tool box 26. As tank cover 42 and the reducing agent tank are arranged with tool box 26 being interposed between them and front end 3f of track frame 3, they are arranged in the rear of front end 3f of track frame 3 at a distance therefrom.

Figure 4:
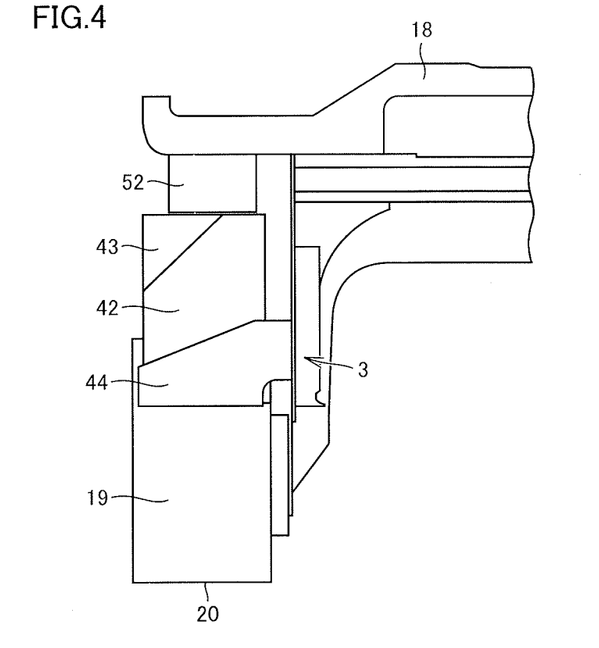
FIG. 4 is a schematic diagram around the reducing agent tank when viewed from the front.

FIG. 4 is a schematic diagram around the reducing agent tank when viewed from the front. As described above, track frame 3 is attached below engine frame 18. A tank support portion 44 is fixed to track frame 3. Tank support portion 44 is arranged on the right in the lateral direction of mobile crusher 1 (on the left in FIGS. 4 and 5 in which mobile crusher 1 is viewed from the front). Tank support portion 44 is arranged at a position closer to a side edge in the lateral direction of mobile crusher 1, than track frame 3.

As shown in FIG. 4, tank cover 42 in which the reducing agent tank is accommodated is mounted on tank support portion 44. Tank cover 42 is supported by track frame 3 with tank support portion 44 being interposed. Tank cover 42 has a lid portion 43. Lid portion 43 is provided to be able to open and close tank cover 42. The reducing agent tank accommodated in tank cover 42 is exposed to the outside by opening lid portion 43. Tank cover 42 is arranged as being superimposed on crawler belt 19 in the front view. A bottom surface of tank cover 42 is arranged at a position lower than an upper surface of crawler belt 19 in the vertical direction.

Pump cover 52 in which the reducing agent pump is accommodated is supported by engine frame 18. Pump cover 52 is fixed to a lower surface of engine frame 18. Pump cover 52 is arranged as being suspended from engine frame 18. A lower surface of pump cover 52 and an upper surface of tank cover 42 are opposed to each other with a small gap lying therebetween, and arranged substantially in parallel to each other. The internal space in pump cover 52 and the tank accommodation space in tank cover 42 are formed as spaces separate from each other.

Figure 5:
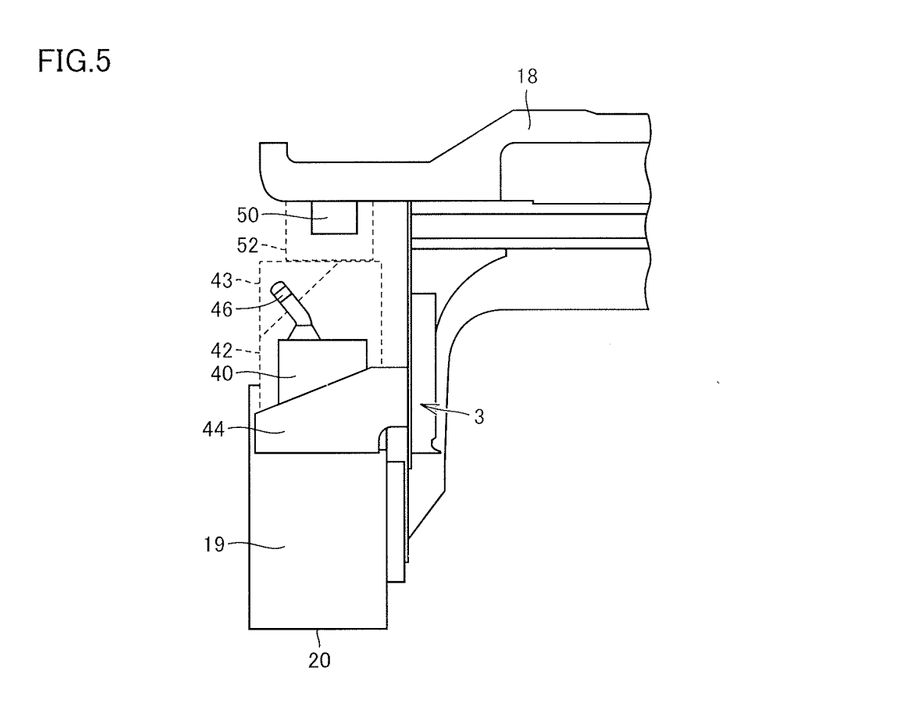
FIG. 5 is a perspective view of a tank cover and a pump cover shown in FIG. 4.

FIG. 5 is a perspective view of tank cover 42 and pump cover 52 shown in FIG. 4. FIG. 5 shows tank cover 42 and pump cover 52 with a dashed line. FIG. 5 illustrates a reducing agent tank 40 accommodated in tank cover 42 and a reducing agent pump 50 accommodated in pump cover 52 with a solid line.

Reducing agent tank 40 storing the reducing agent therein is integrally formed of a resin material excellent in corrosion resistance such as polyethylene. As shown in FIG. 5, reducing agent tank 40 is mounted on tank support portion 44. Reducing agent tank 40 is supported by track frame 3 with tank support portion 44 being interposed. Reducing agent tank 40 has a replenishment port 46. Replenishment port 46 can be opened and closed. By opening replenishment port 46, reducing agent tank 40 can be replenished with the reducing agent. Replenishment port 46 protrudes from tank cover 42 outward by removing lid portion 43 from tank cover 42. Thus, a structure is such that replenishment of reducing agent tank 40 with the reducing agent is facilitated.

Reducing agent pump 50 transferring the reducing agent is supported by engine frame 18. Reducing agent pump 50 is fixed to the lower surface of engine frame 18. Reducing agent pump 50 is arranged as being suspended from engine frame 18. The reducing agent pump is provided under engine frame 18 and above reducing agent tank 40. Reducing agent pump 50 is arranged between engine frame 18 and reducing agent tank 40 in the vertical direction.

As reducing agent tank 40 is arranged with reducing agent pump 50 being interposed between reducing agent tank 40 and engine frame 18, reducing agent tank 40 is arranged below engine frame 18 at a distance therefrom. Reducing agent tank 40 is arranged at a position closer to the ground than engine frame 18. Reducing agent tank 40 is arranged at a position closer to ground engaging surface 20 of crawler belt 19. As reducing agent tank 40 is thus arranged, as shown in FIG. 5, reducing agent tank 40 is arranged as being superimposed on crawler belt 19 in the front view. A bottom surface of reducing agent tank 40 is arranged at a position lower than the upper surface of crawler belt 19 in the vertical direction.

Figure 6:
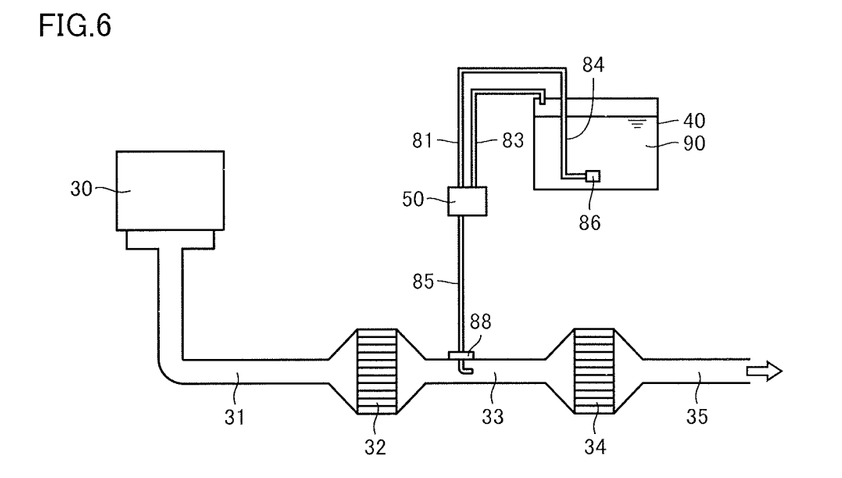
FIG. 6 is a functional diagram schematically showing a path for a reducing agent and a path for exhausting an exhaust gas from an engine.

FIG. 6 is a functional diagram schematically showing a path for the reducing agent and a path for exhausting the exhaust gas from an engine 30. Mobile crusher 1 includes an exhaust gas treatment unit for treating and purifying an exhaust gas emitted from engine 30. The exhaust gas treatment unit mainly includes exhaust gas treatment devices 32 and 34, an intermediate connection pipe 33, an exhaust stack 35, and an injection nozzle 88 for a reducing agent.

Exhaust gas treatment device 32 is connected to engine 30 through an exhaust pipe 31. Exhaust gas treatment device 34 is connected to exhaust gas treatment device 32 through intermediate connection pipe 33. The exhaust gas emitted from engine 30 is emitted from exhaust stack 35 into atmosphere after it successively passed through exhaust pipe 31, exhaust gas treatment device 32, intermediate connection pipe 33, and exhaust gas treatment device 34. In the flow of emission of the exhaust gas from engine 30, exhaust gas treatment device 32 is arranged downstream of engine 30 and exhaust gas treatment device 34 is arranged downstream of exhaust gas treatment device 32.

Exhaust gas treatment device 32 oxidizes an unburned gas such as carbon monoxide and hydrocarbon contained in the exhaust gas emitted from engine 30 so as to lower a concentration of the unburned gas in the exhaust gas. Exhaust gas treatment device 32 is implemented, for example, by a diesel oxidation catalyst device.

Exhaust gas treatment device 34 reduces nitrogen oxides contained in the exhaust gas through reaction with a reducing agent and chemically changes the nitrogen oxides to harmless nitrogen gas, to thereby lower a concentration of the nitrogen oxides in the exhaust gas. Exhaust gas treatment device 34 is implemented, for example, by a $NO_x$ removal device of a selective catalytic reduction type. Intermediate connection pipe 33 on the upstream side of exhaust gas treatment device 34 in the flow of the exhaust gas is provided with injection nozzle 88 for injecting a reducing agent into intermediate connection pipe 33. Intermediate connection pipe 33 has a function as a mixing pipe for injecting and mixing the reducing agent into the exhaust gas.

A reducing agent 90 is stored in reducing agent tank 40. A suction pipe 84 in which reducing agent 90 which flows out of reducing agent tank 40 flows is arranged in reducing agent tank 40. A strainer (a filter) 86 is connected to a tip end of suction pipe 84.

Reducing agent tank 40 and reducing agent pump 50 are coupled to each other through a supply pipe 81 and a return pipe 83. Supply pipe 81 is a pipe for sending the reducing agent from reducing agent tank 40 to reducing agent pump 50. Suction pipe 84 is coupled to supply pipe 81. Return pipe 83 is a pipe for returning the reducing agent from reducing agent pump 50 to reducing agent tank 40. Reducing agent pump 50 and injection nozzle 88 are coupled to each other through a delivery pipe 85. Delivery pipe 85 is a pipe for transferring the reducing agent from reducing agent pump 50 to injection nozzle 88.

Reducing agent 90 suctioned from reducing agent tank 40 is transferred by reducing agent pump 50 and reaches injection nozzle 88 successively through supply pipe 81 and delivery pipe 85. Reducing agent 90 is injected into the exhaust gas which flows through intermediate connection pipe 33, through injection nozzle 88 attached to intermediate connection pipe 33. An amount of the reducing agent injected into the exhaust gas is controlled based on a temperature of the exhaust gas which passes through exhaust gas treatment device 34 and a concentration of nitrogen oxides in the exhaust gas. Reducing agent 90 not used for exhaust gas treatment is returned to reducing agent tank 40 from reducing agent pump 50 through return pipe 83.

The reducing agent transferred from reducing agent tank 40 through supply pipe 81 to reducing agent pump 50 is branched into two in reducing agent pump 50. The reducing agent not used for exhaust gas treatment is returned from reducing agent pump 50 through return pipe 83 to reducing agent tank 40. The reducing agent used for exhaust gas treatment reaches injection nozzle 88 from reducing agent pump 50 through delivery pipe 85 and is sprayed from injection nozzle 88 into intermediate connection pipe 33.

Injection nozzle 88 has a function as a reducing agent injector for injecting reducing agent 90 suctioned from reducing agent tank 40 to the upstream side of the exhaust gas relative to exhaust gas treatment device 34. Injection nozzle 88 supplies reducing agent 90 into the exhaust gas which flows through intermediate connection pipe 33. A concentration of nitrogen oxides in the exhaust gas lowers as a result of reaction of the nitrogen oxide contained in the exhaust gas with reducing agent 90 in exhaust gas treatment device 34. In a case that a urea solution is employed as reducing agent 90, the urea solution is decomposed in intermediate connection pipe 33 and converted to ammonia, so that the nitrogen oxide is decomposed to harmless nitrogen and oxygen as a result of reaction between the nitrogen oxide and ammonia. An exhaust gas of which amount of nitrogen oxides has lowered to an appropriate value is emitted through exhaust stack 35.

Figure 7:
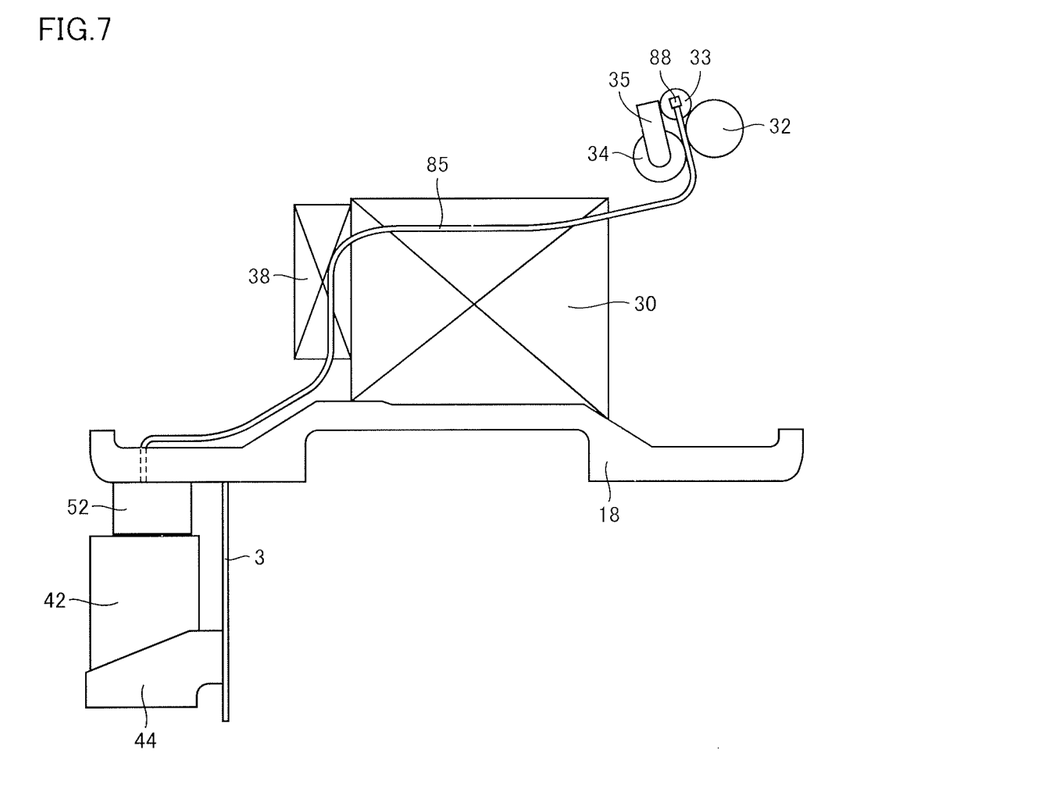
FIG. 7 is a schematic diagram showing a path of piping for the reducing agent.

FIG. 7 is a schematic diagram showing a path of piping for the reducing agent. FIG. 7 shows a diagram in which engine frame 18, engine 30 mounted on engine frame 18, and reducing agent tank 40 (tank cover 42) supported by track frame 3 are viewed from the front of mobile crusher 1.

Engine 30 serving as the motive power source for driving carrier 2 and crushing apparatus 5 shown in FIG. 1 is mounted on engine frame 18. Engine compartment 6 (FIGS. 1 and 2) accommodating engine 30 is provided in a front portion of engine frame 18. A fan 38 is provided on the right of engine 30 in engine compartment 6 (on the left in FIG. 7 when viewed from the front of mobile crusher 1). Fan 38 is rotationally driven by engine 30 to thereby generate a flow of air which passes through engine compartment 6. Fan 38 generates a flow of air from the right to the left of mobile crusher 1. Engine 30 is arranged on the left of fan 38 which is a downstream side in the flow of air generated by fan 38.

The exhaust gas treatment unit is provided in engine compartment 6. The exhaust gas treatment unit is arranged on the left (on the right in FIG. 7) in the lateral direction of mobile crusher 1, relative to engine 30. A not-shown hydraulic pump driven by engine 30 and transferring a hydraulic oil is directly coupled to engine 30. The hydraulic pump is arranged on the left of engine 30 and the exhaust gas treatment unit is arranged above the hydraulic pump. The exhaust gas treatment unit is arranged above engine frame 18 and the hydraulic pump is arranged below the exhaust gas treatment unit.

Delivery pipe 85 couples reducing agent pump 50 and injection nozzle 88 to each other. The reducing agent from reducing agent pump 50 to injection nozzle 88 flows through delivery pipe 85. Delivery pipe 85 extends in the lateral direction from reducing agent pump 50 arranged on the right in the lateral direction of mobile crusher 1 to injection nozzle 88 arranged on the left.

A pump head of reducing agent pump 50 is set so as to be able to transfer the reducing agent from a position of strainer 86 (see FIG. 6) at the tip end of suction pipe 84 provided in reducing agent tank 40 to a position of injection nozzle 88. Delivery pipe 85 is arranged such that an end portion coupled to reducing agent pump 50 is located at a position lowest in the vertical direction and an end portion coupled to injection nozzle 88 is located at a position highest in the vertical direction. Delivery pipe 85 is arranged such that the reducing agent reaching injection nozzle 88 flows upward. With this arrangement of delivery pipe 85, while reducing agent pump 50 remains stopped, the reducing agent moves downward as a result of action of gravity and moves away from injection nozzle 88. Therefore, clogging of injection nozzle 88 by the reducing agent which remains in injection nozzle 88 is avoided.

Figure 8:
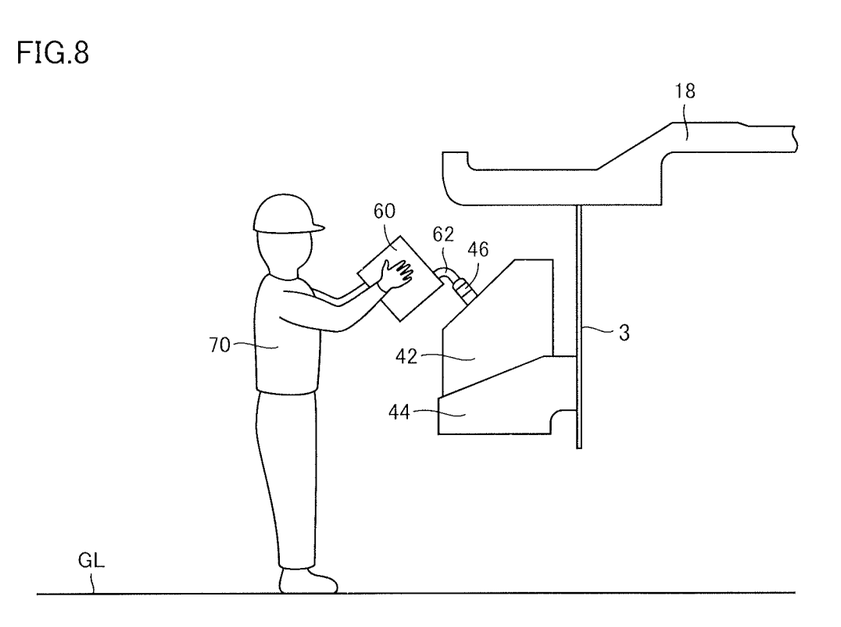
FIG. 8 is a schematic diagram showing an operation for replenishing the reducing agent tank with the reducing agent.

FIG. 8 is a schematic diagram showing an operation for replenishing reducing agent tank 40 with reducing agent 90. Tank cover 42 shown in FIG. 8 is in an open state with lid portion 43 shown in FIGS. 4 and 5 having been removed, and replenishment port 46 of reducing agent tank 40 protrudes outward.

An operator 70 replenishes reducing agent tank 40 with the reducing agent by holding with his/her hands, a container 60 accommodating the reducing agent for replenishment and inserting a nozzle 62 into replenishment port 46 and allowing the reducing agent to flow into reducing agent tank 40. Container 60 may be such a bag-in-box that a container made of polyethylene is further covered with a corrugated cardboard. Since reducing agent tank 40 is arranged below engine frame 18 at a distance therefrom and reducing agent tank 40 is arranged at a position closer to a ground surface GL, an operation for replenishing reducing agent tank 40 with the reducing agent is allowed while operator 70 stands on ground surface GL.

A function and effect of the present embodiment will now be described.

As shown in FIG. 6, mobile crusher 1 in the present embodiment includes exhaust gas treatment device 34 treating an exhaust gas from engine 30 through reduction reaction and reducing agent tank 40 storing reducing agent 90 supplied to exhaust gas treatment device 34. As shown in FIGS. 1 and 3, reducing agent tank 40 is arranged in front of front end 19f of crawler belt 19 and in the rear of front end 3f of track frame 3 in the fore/aft direction. As shown in FIGS. 3 to 5, reducing agent tank 40 is arranged below engine frame 18 at a distance therefrom. As shown in FIGS. 4 and 5, reducing agent tank 40 is arranged as being superimposed on crawler belt 19 in the front view.

In mobile crusher 1, since discharge conveyor 7 should be provided below engine frame 18, engine frame 18 is provided at a position higher than in other work vehicles such as a hydraulic excavator. The conventional reducing agent tank described in PTD 1 is provided in the reducing agent tank mount portion formed to continue to the space in the machine compartment formed on the engine frame. Therefore, the reducing agent tank is arranged at a position in the vicinity of the engine frame, although it is below the engine frame. Consequently, the reducing agent tank is arranged at a distance from the ground and it has been difficult for an operator who stands on the ground to replenish the reducing agent tank with the reducing agent.

In the present embodiment, reducing agent tank 40 is arranged below engine frame 18 at a distance therefrom, reducing agent tank 40 is superimposed on crawler belt 19 in the front view, and the bottom surface of reducing agent tank 40 is arranged below the upper surface of crawler belt 19. Thus, as compared with conventional arrangement of the reducing agent tank, reducing agent tank 40 is arranged at a position closer to the ground. By thus defining arrangement of reducing agent tank 40 in the vertical direction, reducing agent tank 40 is arranged at a position closer to an operator who stands on the ground. Therefore, the operator can readily replenish reducing agent tank 40 with the reducing agent while he/she stands on the ground.

The conventional mobile crusher described in PTD 1 has been constructed to feed cooling wind which flows toward the engine to the reducing agent tank mount portion in order to promote heat radiation. In contrast, reducing agent tank 40 in the present embodiment is arranged below engine frame 18 at a distance therefrom and arranged in a space not communicating with engine compartment 6 accommodating engine 30. Tank cover 42 in which reducing agent tank 40 is accommodated is provided separately from an outer cover of engine compartment 6.

An air layer is formed between engine 30 and reducing agent tank 40 and this air layer exhibits a heat insulating effect. Thus, heat transfer from engine 30 to reducing agent tank 40 is suppressed. Therefore, reducing agent tank 40 can sufficiently be cooled through natural heat radiation, and a feature for cooling reducing agent tank 40 as in the conventional reducing agent tank described in PTD 1 is not necessary. Therefore, the construction of mobile crusher 1 including reducing agent tank 40 can be simplified.

Cooling wind supplied to engine 30 as fan 38 is driven flows from a right portion of mobile crusher 1 into engine compartment 6. Air of which temperature has been raised as it receives heat transfer from engine 30 flows out of engine compartment 6 on the left side of mobile crusher 1. As shown in FIG. 1, reducing agent tank 40 is arranged in the right portion of mobile crusher 1 and fixed to track frame 3 which is on the right of the pair of left and right track frames 3. Thus, air at a high temperature heated by engine 30 can be prevented from flowing around reducing agent tank 40.

Therefore, overheat of the reducing agent stored in reducing agent tank 40 can more reliably be suppressed.

As shown in FIGS. 4 and 5, reducing agent tank 40 is superimposed on crawler belt 19 in the front view, in the lateral direction of mobile crusher 1. By arranging reducing agent tank 40 near a side edge in the lateral direction of mobile crusher 1, access to reducing agent tank 40 is facilitated and operability at the time of replenishment of reducing agent tank 40 with the reducing agent can be improved. Reducing agent tank 40 is arranged on an inner side relative to an outermost outer edge portion of crawler belt 19 in the lateral direction. In the lateral direction, reducing agent tank 40 is arranged at a position not protruding from crawler belt 19. Therefore, collision of a foreign matter against reducing agent tank 40 can be suppressed and damage to reducing agent tank 40 can be suppressed.

As shown in FIGS. 1 and 3, reducing agent tank 40 is superimposed on crawler belt 19 in the front view, at a position adjacent to front end 19f of crawler belt 19. In order to avoid interference between reducing agent tank 40 and crawler belt 19, a gap is formed between reducing agent tank 40 and crawler belt 19, however, no other member is arranged between reducing agent tank 40 and front end 19f of crawler belt 19. In the fore/aft direction of mobile crusher 1, reducing agent tank 40 is arranged in front of front end 19f of crawler belt 19 at a small distance therefrom and arranged in the rear of front end 3f of track frame 3 at a distance therefrom. Reducing agent tank 40 is arranged at a position not superimposed on crawler belt 19 in a plan view of mobile crusher 1.

The conventional reducing agent tank described in PTD 1 is arranged with the maintenance ladder being interposed between the reducing agent tank and the crawler belt, and hence it is arranged at a position close to the front end of a carrier frame. In contrast, reducing agent tank 40 in the present embodiment is arranged further in the rear in the fore/aft direction of mobile crusher 1 and arranged closer to crawler belt 19. By doing so, reducing agent tank 40 can reliably be arranged above the straight line passing through tip end portion 14t of scraper 14 and front end 20f of ground engaging surface 20 in a side view, which is shown with chain double dotted line L in FIG. 1. Therefore, contact between reducing agent tank 40 and the ground while mobile crusher 1 runs on a slope can be suppressed.

By arranging reducing agent tank 40 at a position not superimposed on crawler belt 19 in a plan view, interference between reducing agent tank 40 and crawler belt 19 is avoided even though reducing agent tank 40 is arranged such that the bottom surface of reducing agent tank 40 is lower than the upper surface of crawler belt 19. Therefore, reducing agent tank 40 can be arranged below engine frame 18 at a distance therefrom while interference between reducing agent tank 40 and crawler belt 19 is reliably avoided.

As shown in FIGS. 1 and 3, crawler belt 19 has ground engaging surface 20 coming in contact with the ground. Discharge conveyor 7 has scraper 14. Tip end portion 14t of scraper 14 forms a portion of discharge conveyor 7, which protrudes most on a side of the ground with respect to direction of movement D of disposed objects. Reducing agent tank 40 is arranged above the straight line shown with chain double dotted line L in FIG. 1 which passes through tip end portion 14t of scraper 14 and front end 20f of ground engaging surface 20 of crawler belt 19 in the side view.

Mobile crusher 1 has a crawler belt type travel apparatus and may run on a land which has not been graded or on a steep slope. When reducing agent tank 40 is placed at a position close to the ground, reducing agent tank 40 may come in contact with the ground or a foreign matter on the ground and reducing agent tank 40 may be damaged while mobile crusher 1 runs. By setting arrangement of reducing agent tank 40 above chain double dotted line L in FIG. 1, contact of reducing agent tank 40 with the ground and the like can be suppressed also when mobile crusher 1 runs on a land which has not been graded or on a steep slope. Therefore, damage to reducing agent tank 40 can be suppressed.

As shown in FIGS. 1 and 3, mobile crusher 1 further includes control panel 8 for operating mobile crusher 1. Reducing agent tank 40 is arranged adjacent to control panel 8.

When reducing agent tank 40 is not appropriately replenished with the reducing agent and the reducing agent in reducing agent tank 40 runs out, treatment of the exhaust gas from engine 30 cannot be continued. Therefore, an operation of mobile crusher 1 should be stopped under emission regulations. If a state of operation of crushing apparatus 5 fluctuates during an operation by crushing apparatus 5 for crushing crush objects, quality of crushed disposed objects also varies and hence the disposed objects cannot be used as a recycled source material.

An amount of reducing agent stored in reducing agent tank 40 at the current stage is displayed on control panel 8. A warning at the time when an amount of reducing agent in reducing agent tank 40 decreases is also displayed on control panel 8. An operator who operates mobile crusher 1 regularly checks control panel 8 for operation or for checking of a condition. The operator can check an amount of reducing agent in reducing agent tank 40 by looking at a display on control panel 8. Therefore, when an amount of reducing agent in reducing agent tank 40 decreases, reducing agent tank 40 can appropriately be replenished with the reducing agent. By arranging reducing agent tank 40 at a position adjacent to control panel 8, the operator who has checked control panel 8 can promptly replenish reducing agent tank 40 with the reducing agent and hence operability can be improved.

As shown in FIGS. 3 to 5, mobile crusher 1 further includes reducing agent pump 50 transferring the reducing agent. Reducing agent pump 50 is arranged between engine frame 18 and reducing agent tank 40. By arranging reducing agent pump 50 between engine frame 18 and reducing agent tank 40, reducing agent tank 40 can reliably be arranged at a position below engine frame 18 at a distance therefrom. By arranging reducing agent pump 50 in a free space between reducing agent tank 40 and engine frame 18, the space can effectively be used.

As shown in FIGS. 4 and 5, reducing agent tank 40 is supported by track frame 3. As track frame 3 arranged below engine frame 18 supports reducing agent tank 40, reducing agent tank 40 can reliably be supported and fixed at a position below engine frame 18 at a distance therefrom.

Though the embodiment of the present invention has been described above, it should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is particularly advantageously applicable to a mobile recycler including an exhaust gas treatment device treating an exhaust gas from an engine through reduction reaction, such as a mobile crusher, a mobile wood grinder, and a mobile soil recycler.

REFERENCE SIGNS LIST

1 mobile crusher; 2 carrier; 3 track frame; 3f, 19f, 20f front end; 4 crush object feeding apparatus; 5 crushing apparatus; 6 engine compartment; 7 discharge conveyor; 8 control panel; 14 scraper; 14t tip end portion; 18 engine frame; 19 crawler belt; 20 ground engaging surface; 26 tool box; 30 engine; 31 exhaust pipe; 32, 34 exhaust gas treatment device; 33 intermediate connection pipe; 35 exhaust stack; 38 fan; 40 reducing agent tank; 42 tank cover; 43 lid portion; 44 tank support portion; 46 replenishment port; 50 reducing agent pump; 52 pump cover; 60 container; 62 nozzle; 70 operator; 81 supply pipe; 83 return pipe; 84 suction pipe; 85 delivery pipe; 86 strainer; 88 injection nozzle; 90 reducing agent; D direction of movement; and GL ground surface.

The invention claimed is:

1. A mobile recycler, comprising:
   an engine generating driving force;
   an engine frame on which said engine is mounted;
   a track frame attached below said engine frame;
   a pair of traveling apparatuses supported on said track frame and having a crawler belt;
   a work implement mounted on said engine frame;
   a discharge conveyor extending forward between said pair of traveling apparatuses and transporting a disposed object discharged from said work implement;
   an exhaust gas treatment device treating an exhaust gas from said engine through reduction reaction; and
   a reducing agent tank storing a reducing agent supplied to said exhaust gas treatment device,
   said reducing agent tank being arranged in front of a front end of said crawler belt and in rear of a front end of said track frame in a fore/aft direction, below said engine frame at a distance from the engine frame such that a bottom surface of the reducing agent tank is arranged at a position lower than an upper surface of said crawler belt.

2. The mobile recycler according to claim 1, wherein
   said reducing agent tank is superimposed on said crawler belt in the front view at a position adjacent to the front end of said crawler belt.

3. The mobile recycler according to claim 1, wherein
   said crawler belt has a ground engaging surface coming in contact with a ground, and
   said reducing agent tank is arranged above a straight line which passes through a portion of said discharge conveyor protruding most on a side of the ground with respect to a direction of movement of said disposed object and a front end of said ground engaging surface in a side view.

4. The mobile recycler according to claim 1, further comprising a control panel for operating said mobile recycler, wherein
   said reducing agent tank is arranged adjacent to said control panel.

5. The mobile recycler according to claim 1, further comprising a pump for transferring said reducing agent, wherein
   said pump is arranged between said engine frame and said reducing agent tank.

6. The mobile recycler according to claim 1, wherein
   said reducing agent tank is supported by said track frame.

\* \* \* \* \*